US007885542B2

(12) United States Patent
Riggsby

(10) Patent No.: US 7,885,542 B2
(45) Date of Patent: Feb. 8, 2011

(54) FORMAT CONVERTER WITH SMART MULTITAP AND UPSTREAM SIGNAL REGULATOR

(76) Inventor: Robert R. Riggsby, 95 Brandon Ridge Dr. NE., Sandy Springs, GA (US) 30328

( * ) Notice: Subject to any disclaimer, the term of this patent is extended or adjusted under 35 U.S.C. 154(b) by 1061 days.

(21) Appl. No.: 11/456,145

(22) Filed: Jul. 7, 2006

(65) Prior Publication Data
US 2008/0010488 A1   Jan. 10, 2008

(51) Int. Cl.
*H04J 14/00* (2006.01)
(52) U.S. Cl. .............................. 398/67; 398/68; 398/72
(58) Field of Classification Search ............. 398/66–74, 398/115
See application file for complete search history.

(56) References Cited

U.S. PATENT DOCUMENTS

| 5,715,020 | A  | * | 2/1998 | Kuroiwa et al. ............. 348/734 |
| H1858 | H  |   | 9/2000 | Ibelings |
| 7,218,855 | B2 | * | 5/2007 | Whittlesey et al. ............ 398/72 |
| 2002/0136231 | A1 | * | 9/2002 | Leatherbury et al. ........ 370/442 |
| 2004/0028153 | A1 | * | 2/2004 | Kien et al. .................. 375/326 |
| 2004/0111753 | A1 |   | 6/2004 | Hoang |
| 2005/0144648 | A1 | * | 6/2005 | Gotwals et al. ............. 725/111 |
| 2005/0201752 | A1 | * | 9/2005 | Bai ............................ 398/30 |

FOREIGN PATENT DOCUMENTS

| EP | 0 651 530 A2 | 5/1995 |
| WO | WO 97/44986 | 11/1997 |
| WO | WO 01/69831 | 9/2001 |
| WO | WO 03/005611 | 1/2003 |
| WO | WO 03/050979 A1 | 6/2003 |
| WO | WO 2004/014010 | 2/2004 |
| WO | WO 2008/005958 | 1/2008 |
| WO | WO 2008/011270 | 1/2008 |

OTHER PUBLICATIONS

U.S. Appl. No. 11/456,138, filed Jul. 7, 2006, Entitled "Format Converter with Smart Multitap." Inventor: Robert R. Riggsby.
U.S. Appl. No. 11/456,154, filed Jul. 7, 2006, Entitled "Format Converter with Smart Multitap with Digital Forward and Reverse." Inventor: Robert R. Riggsby.

* cited by examiner

*Primary Examiner*—Dzung D Tran
(74) *Attorney, Agent, or Firm*—Tarolli, Sundheim, Covell & Tummino LLP

(57) ABSTRACT

Systems and methods for signal conversion with smart multitap are disclosed. Embodiments of the systems can be scalable to model different signal topologies, transmission frequencies, bandwidths, and distances. An exemplary embodiment of the systems and methods includes a fiber optic to RF converter and a smart multitap. Although a fiber optic to RF converter is used in exemplary embodiments throughout the disclosure, conversion between other signal topologies is within the scope of the disclosure. The smart multitap includes a multiple tap for distributing a signal to multiple terminals and a microprocessor to select a particular terminal for a signal. Exemplary embodiments include downstream implementations in which a stream is typically sent from a service provider server to a user. Alternative embodiments include downstream implementations as well as upstream implementations in which a user typically sends a stream to a service provider server.

19 Claims, 9 Drawing Sheets

FORMAT CONVERTER WITH SMART MULTITAP AND UPSTREAM SIGNAL REGULATOR

CROSS-REFERENCE TO RELATED APPLICATIONS

This application is related to co-pending U.S. patent application entitled "Format Converter with Smart Multitap" having Ser. No. 11/456,138 which is filed on the same day as, and with identical inventorship as, the present application. This application is also related to co-pending U.S. patent application entitled "Format Converter with Smart Multitap with Digital Forward and Reverse" having Ser. No. 11/456,154 which is filed on the same day as, and with identical inventorship as, the present application. The related co-pending patent applications listed above are hereby incorporated by reference in their entirety into the present disclosure.

TECHNICAL FIELD

The present disclosure is generally related to data transmission and, more specifically to transmission of data to multiple terminals.

BACKGROUND

Electrical signals can be used for the transmission and distribution of media signals, such as video and audio. The signals could incorporate, for example, analog and/or digital video, Moving Picture Experts Group streams (i.e. MPEG-1, MPEG-2, MPEG-4 (i.e. H.264)), Windows® Media (VC-1) streams, RealAudio streams, or MPEG Audio Layer-3 (mp3) streams, among others that can be used for the transmission of audio and/or video signals in compressed digital streams. Accordingly, within the context of this disclosure, a signal could comprise one or more of an audio stream, a video stream, or any other underlying media signals used to convey information (text, graphics, animation, charts, graphs, etc.).

Such signals may be transmitted over a variety of distribution channels such as computer networks, satellite links, cable television (CATV) lines, radio-frequency signals, and digital subscriber lines (DSL), among others. A common medium used to transmit the signals is a fiber optic cable. Fiber optic cables offer advantages in transmission speed, flexibility of the cables, and bundling of the cables with minimal crosstalk issues, longevity, and upgradeability. However, since most user terminals cannot accept fiber optic signals, the fiber optic signal may be converted to another format or topology, such as, a radio frequency RF) signal. Another consideration for transmitting the signals appears in multiple distribution point systems in high density areas. Having a system with a fiber optic to RF converter for each unit in a high density area can become exceedingly expensive. Accordingly, in light of these potential deficiencies, among others, it is desirable to provide a fiber optic to RF converter with a multi-tap capabilities.

BRIEF DESCRIPTION OF THE DRAWINGS

The components in the drawings are not necessarily to scale relative to each other. Like reference numerals designate corresponding parts throughout several views.

DETAILED DESCRIPTION

Systems and methods for signal conversion with smart multitap are disclosed. Embodiments of the systems can be scalable to model different signal topologies, transmission frequencies, bandwidths, and distances. An exemplary embodiment of the system includes a fiber optic to RF converter and a smart multitap. Although a fiber to RF converter is used in exemplary embodiments throughout the disclosure, conversion between other signal topologies is within the scope of the disclosure. The smart multitap includes a multiple tap for distributing a signal to multiple terminals and a microprocessor to select a particular terminal for a signal. Exemplary embodiments include downstream implementations in which a stream is typically sent from a service provider server to a user. Alternative embodiments include downstream implementations as well as upstream implementations in which a user typically sends a stream to a service provider server.

Figure 1:
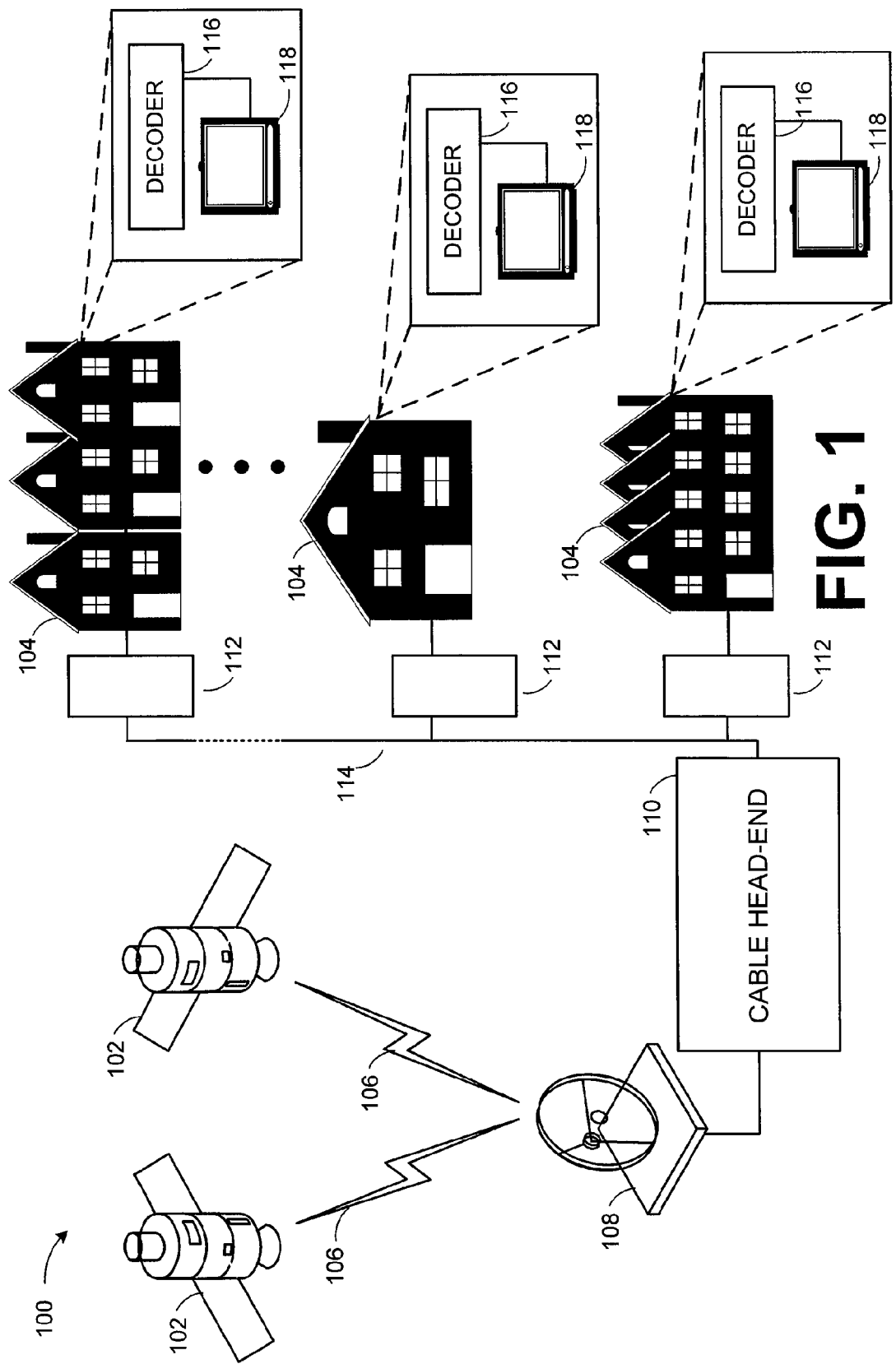
FIG. 1 depicts an exemplary embodiment of a cable television distribution network.

The described converter and smart multitap could be used in a number of potential electronic systems. FIG. 1 depicts an embodiment of one particular electronic system, a cable television distribution network 100 in which embodiments of the converter and smart tap described herein may be used. In general, network 100 relays multimedia signals received from a number of sources, such as satellites 102, to a plurality of remote locations 104. Such multimedia signals could be, for example, video and/or audio signals, which could also be transmitted with additional network data, including Internet traffic, teletext, closed captioning, among others. The remote location 104 could be residences, educational facilities, or businesses that pay for, or otherwise receive cable television programming. Although reference may be made generally to multimedia signals throughout the detailed description, signals having only one form of media, such as audio or video signals alone, are intended to be well within the scope of the disclosure. Some exemplary embodiments provided herein allow multiple sources to have access to a transmission pipe to the home. This enables a user to select from several different types of competing services.

Such multimedia signals and/or data signals may be transmitted over downlink 106 from satellites 102 to respective receiver 108 at cable head end 110. The signals received at cable head end 110 may be multiplexed data streams. Such data streams may comprise compressed multimedia streams transmitted in a variety of formats, such as, but not limited to, MPEG 1, MPEG 2, MPEG 4, VC1, MP3, and/or RealAudio streams. Such compressed multimedia streams may be transmitted to cable head end 110 at a variety of bit rates. The fiber to RF converter and smart multitap may be located in the communication/transmission system 112 to distribute the stream to multiple units in a high density multiple dwelling unit (MDU), for example. This decreases costs associated with distributing the fiber signal to individual homes. If a fiber to RF converter were necessary for each unit, the costs increase dramatically. The streams can be transmitted over communication connection 114 to one or more converters at remote location 104. Communication connection 114 may be, among others, a communications medium such as fiber optic cable, coaxial cable, telephone line, or wireless connection. Decoder 116 can, for example, decode and extract multimedia signals from the transmitted streams for playback on playback device 118. Playback device 118 could be, for example, a television or audio playback system.

Decoder 116 could be, for example, in a cable television set top box. According to other embodiments, decoder 116 could be associated with a television, stereo system, or computing device (e.g., personal computer, laptop, personal digital assistant (PDA), etc.). Decoder 116 may receive a plurality of programs on a respective channel, each channel carried by a respective multimedia stream (which can include audio and video signals, among others). Although the fiber to RF converter and smart multitap may be described in certain embodiments as being included at the MDU, the converter and smart tap could also be used in a number of other locations, such as in head end 110 or in receiver 108, among others. For example, according to such an embodiment, receiver 108 may receive a signal in one format that is to be converted into a signal in another format and then transmitted to multiple terminals within head end 110 or outside head end 110.

Now that a number of potential non-limiting environments have been described in which the disclosed converter and smart multitap may be used, attention is now directed to various exemplary embodiments of such converter and smart multitap. It should be understood that any of the methods of processing described herein could be implemented in hardware, software, or any combination thereof. For example, when processing or process steps are implemented in software, it should be noted that such steps to perform processing could be stored on any computer-readable medium for use by, or in connection with, any computer related system or method. In context of this document, the computer-readable medium is an electronic, magnetic, optical, or other physical device or means that can contain or store a computer program for use by, or in connection with, a computer related system or method. The methods can be embodied in any computer readable medium for use by, or in connection with, an instruction execution system, apparatus, or device, such as a computer based system, processor containing system, or other system that can fetch the instructions from the instruction execution system, apparatus, or device to execute the instructions.

In some embodiments, where the processing is implemented in hardware, the underlying methods can be implemented with any, or a combination of, the following technologies, which are each well-known in the art: (a) discrete logic circuit(s) having logic gates for implementing logic functions upon data signals, an application specific integrated circuit (ASIC) having appropriate combinational logic gates, (a) programmable gate array(s) (PGA), a field programmable gate array (FPGA), etc.; or can be implemented with other technologies now known or later developed.

Any process descriptions, steps, or blocks in flow diagrams should be understood as potentially representing modules, segments, or portions of code which include one or more executable instructions for implementing specific logical functions or steps in a process, and alternate implementations are included within the scope of the preferred embodiments of the methods in which functions may be executed out of order from what is shown or discussed, including substantially concurrently, or in reverse order, depending on the functionality involved, as would be understood by those reasonable skilled in the art.

Figure 2:
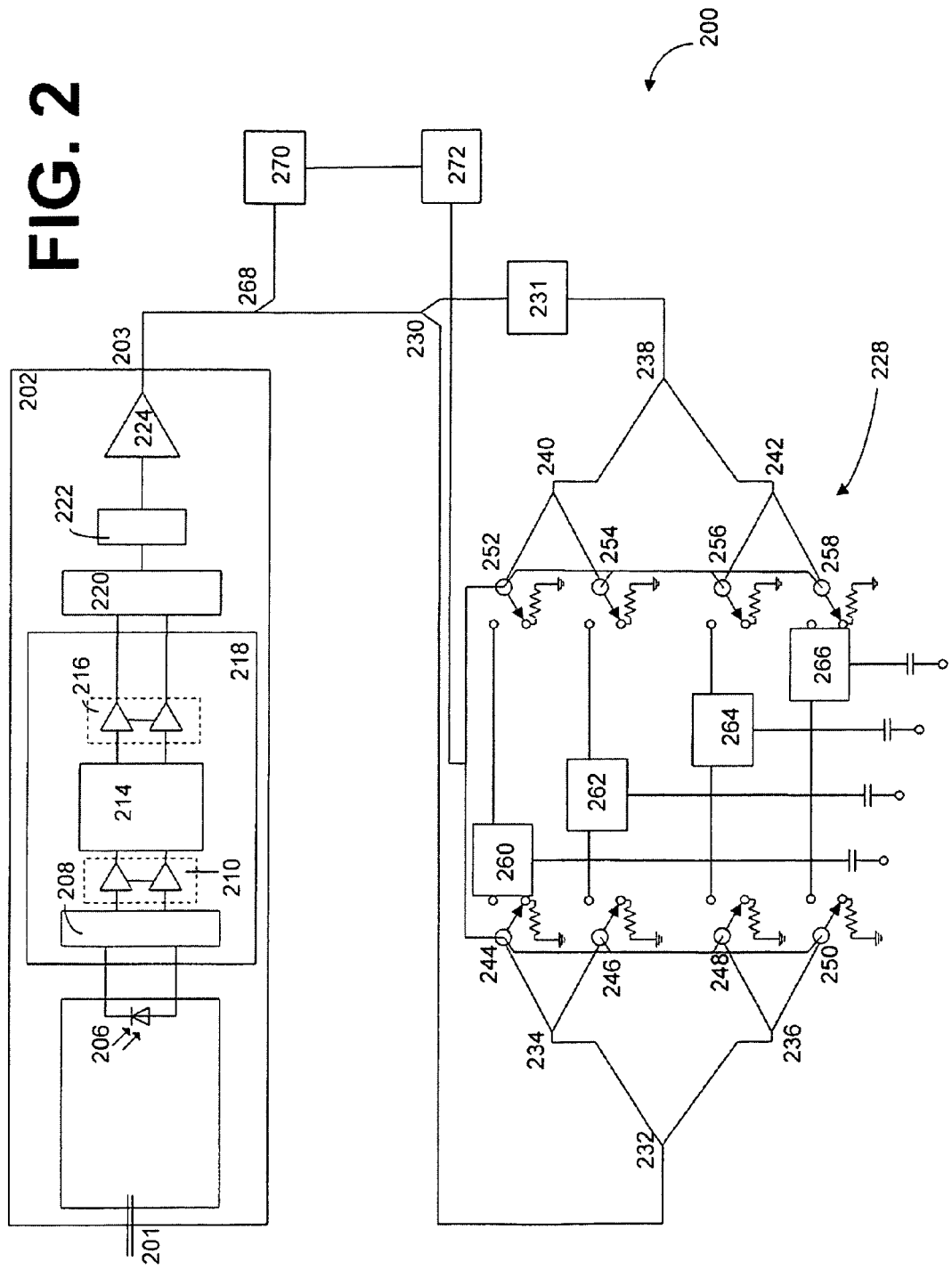
FIG. 2 is a schematic diagram of an exemplary embodiment of a down stream fiber optic to RF converter with a smart multitap used in the cable television distribution network of FIG. 1.

FIG. 2 depicts an embodiment of fiber to RF converter and smart multitap system 200 that can be used at a business, educational facility, or MDU, in the cable head end 110 (or decoder 116, etc.) of FIG. 1. The fiber to RF converter and smart tap system 200 comprises fiber to RF converter 202 and smart multitap 228. A fiber to multiple dwelling unit embodiment may be utilized in a customer premise device for condominiums, apartment complexes, and other high density areas. A normal fiber to the home connection with one home may comprise fiber to RF converter 202. However, using multiple converters 202 is expensive for a multiple dwelling unit due to the increased number of fibers and fiber to RF converters required to feed each individual unit at an MDU location. The smart tap shown includes four terminals, however, any number of taps could be configured. For example, 4 taps, 8 taps, 12 taps, 16 taps, etc.

Fiber to RF converter 202 comprises fiber optic input 201 and RF output 203. Photodiode 206 receives a signal from fiber optic input 201 where it is then converted to an RF signal. The RF signal is conditioned for output in signal conditioning block 218, which includes bias stage 208, pre-amp stage 210, automatic gain control (AGC) stage 214, and interstage-amp gain stage 216. The amplifier stages may comprise push-pull amplifiers, linear amplifiers, digital amplifiers, or other means of amplification known now or later developed. The RF signal is biased by bias network 208 and amplified in pre-amp stage 210. AGC is applied at gain control stage 214 and the signal is again amplified at interstage amp stage 216. Transformer 220 then takes the output of push-pull interstage amp 216 to generate the RF signal. Tilt stage 222 applies a tilt to the signal, and output gain stage 224 applies a final amplification to the signal where it is presented at RF output 203.

An advantage of using fiber optics follows from a constant level of loss/frequency compared to different levels of loss/frequency for other media. For instance, in fiber optics, there is a single wavelength sent through the fiber. So losses occur, but the losses are constant because the signals are transmitted on a single wavelength. In a cable television (CATV) system, each TV channel is transmitted on a different frequency. Channel 2 may be transmitted at 55.25 MHz, for example, while channel 110 may be transmitted at 745.25 MHz. For each channel in a typical CATV system, there may be 6 MHz between successive channels. So, for example, for a CATV system with one hundred and ten channels, the total bandwidth of the TV system is 6 multiplied by 110 channels added to the frequency that the lowest channel is transmitted on plus any offset due to FM radio and over the air channel spacing. Through a coaxial cable, higher frequencies attenuate at a higher rate than lower frequencies. Therefore, a cable-shape loss occurs. Since the cable looks like a low pass filter, as the signal travels down the coaxial cable, a loss occurs proportional to the length of the cable. When the signal propagates through tilt stage 222 of converter 202, it is uptilted such that a higher frequency signal is attenuated less than a lower frequency signal. Adding the uptilt from tilt 222 to the downtilt from the cable produces a flat overall response. Tilt stage 222 counteracts for the cable loss. Tilt stage 222 may be implemented in one of many circuits known the art. Some gain is sacrificed in tilt stage 222 but the result is a flat signal response.

Smart multitap 228 includes receiver 270, processor 272, splitters 230, 232, 234, 236, 238, 240, and 242, switches 252, 254, 256, 258, 244, 246, 248, 250, and terminals 260, 262, 264, and 266. Switch pairs 252 and 244, 254 and 246, 256 and 248, and 258 and 250 may each be embodied in a single switch. Receiver 270 includes a bandpass filter to filter a control signal from RF output 203. This control signal is tapped off of RF output 203 at coupler 268. The control signal is then sent from receiver 270 to processor 272 to determine which of terminals 260, 262, 264, and 266 should receive the RF signal. The RE signal progresses through splitter 230, which routes the RE signal into one of two directions. One path goes to splitter 232 while the other path passes through filter 231 and then to splitter 238. Filter 231 may be used to filter signals that individual customers have not subscribed to.

For example CATV systems have multiple levels of service; they may have a digital tier versus an all analog tier; they may have pay per view or even digital internet traffic. Accordingly, filter 231 allows a system operator to remotely enable what services a customer receives. From splitter 232 and 238 the RF signal proceeds through several splitters to create twice the number of feeds as terminals 260, 262, 264 and 266. A single RF feed from the non filtered side and a single feed from the filtered side of splitter 230 emerge from the final set of splitters. Each RF feed, filtered and non-filtered, enters switches 252, 254, 256 and 258. Each switch 252, 254, 256, 258 receives a command from processor 272 directing it to either use the filtered or non-filtered RF feed. The specific RE feed chosen by processor 272 emerges from the common port of the switches 252, 254, 256 and 258 and exits the multitap through terminals 260, 262, 264 and 266. Switches 252, 254, 256 and 258 also may be terminated via the processor 272. This is useful for, among other possibilities, disabling a customer who no longer lives in a residence without having to send a technician to turn off the RF feed, or to test for ingress from specific locations that could be degrading system performance.

In one embodiment, the fiber to RF converter and smart multitap application uses multiple wavelength optical signals to accomplish transmission of video, voice, and data. The receiver may comprise several stages, most of which can be implemented in different ways. Photodiode 206 can be a stand-alone photodiode if, for example, external wavelength division multiplex components are used. In some embodiments, photodiode 206 may be enclosed in a diplexer or triplexer module which may include other wavelength division optical components.

Photodiode 206 may be biased in a number of ways. In an exemplary embodiments, the biasing may be accomplished through the bias network 208, which also may serve to improve receiver noise performance. Other options include biasing photodiode 206 directly and using a high impedance preamplifier stage such as preamplifier stage 210 to act as the amplification and matching network for improved noise capability. Preamplifier stage 210 may match photodiode 206 to a lower output impedance. Pre-amp stage 210 and interstage amplifier stage 216 may be co-located into a single integrated circuit, or they may be separate. Interstage amp stage 216 may, for example, provide sufficient gain for smart multitap 228 to drive a home network comprising a four-way splitter and nominal system coaxial cable loss. The final output impedance of terminals 260, 262, 264, and 266 may be 75 ohms, which is typical for an in-home distribution network.

Amplifiers 210 and 216 of signal conditioning block 218 may be push-pull circuits, but also could be single-ended stages, if their linearity performance is sufficient. This could eliminate some transformers, thereby reducing costs. If the input noise performance of preamplifier stage 210 is low, cost may be reduced by eliminating the bias network 208 and by biasing photodiode 206 through RF chokes.

Signal conditioning network 218 compensates for a potentially wide input optical power or for variations in the channel loading from head end 110. An open loop compensation stage is incorporated to compensate for a signal derived from a sense line from photodiode 206. The optical input power is sensed, and a predetermined back-off is set to maintain an acceptable output signal level from terminals 260, 263, 264, and 266. In this way, installation may be simplified, as there is no need to set the output RF level. A 10 db variation in input optical power may result in a 20 db variation in RF level (prior to the gain control block 218), which is excessive for television 118 and set top terminal 116. The predetermined back-off approach is used if an optical modulation index (OMI) is known, and is constant.

A more sophisticated gain control option may include a linear gain control circuit that is driven from an RF detection circuit. The detected level could be used in a closed loop automatic gain control function, which would be useful if the OMI is not known. This gain control circuit regulates the gain based on the power level it receives from the RF detector to maintain a constant level at RF output 203. Since OMI can change as a function of channel loading, closed loop control is more effective for systems that evolve over time. The location of gain control circuit 214 is shown between pre-amplifier stage 210 and interstage amplifier stage 216, but could be placed between interstage amplifier stage 216 and output gain stage 224. Positioning gain control circuit 214 between input stage amplifier 210 and interstage amplifier 216 may reduce the linearity requirements of the interstage and post amplifiers 216 and 224. However, it degrades the noise performance and potentially adds costs due to the need for additional transformers 220.

A less expensive automatic gain control approach involves limiting the gain variability to 0 db loss or 10 db loss. The threshold point can be adjusted to optimize noise performance, keeping RF output levels within allowable limits. Adding hysteresis to the control circuitry may eliminate an oscillatory state around the threshold point.

A feature of fiber optic to RF converter and smart multitap 200 is a configurable number of ports offered from one fiber optic line. Smart multitap may provide non-limiting examples of 4, 8, 12, and 16-way capabilities. The smart multitap is not limited to any number of port configurations. Converter and multitap 200 also provide several video conditioning options, full service, tiered, and/or filter services, and the capability to turn off individual ports. The filtered and off state services provide high insulation to prevent video theft.

Another feature of fiber to RF converter and smart multitap 200 is remote enabling capability. The service provider can control the services provided through smart multitap 228. It could provide on (full service), tiered (through the use of the tiering filter capability of the smart multitap section), and off (disable the video) remotely through the network using a signal generated at head end 110 and deciphered by control signal receiver 270 in smart multitap 228. The enabling information is then sent to processor 272 which enables switches 252, 254, 256, and 258 in smart multitap 228 to select which of terminals 260, 262, 264, and 266 is to receive the RF signal.

Figure 3:
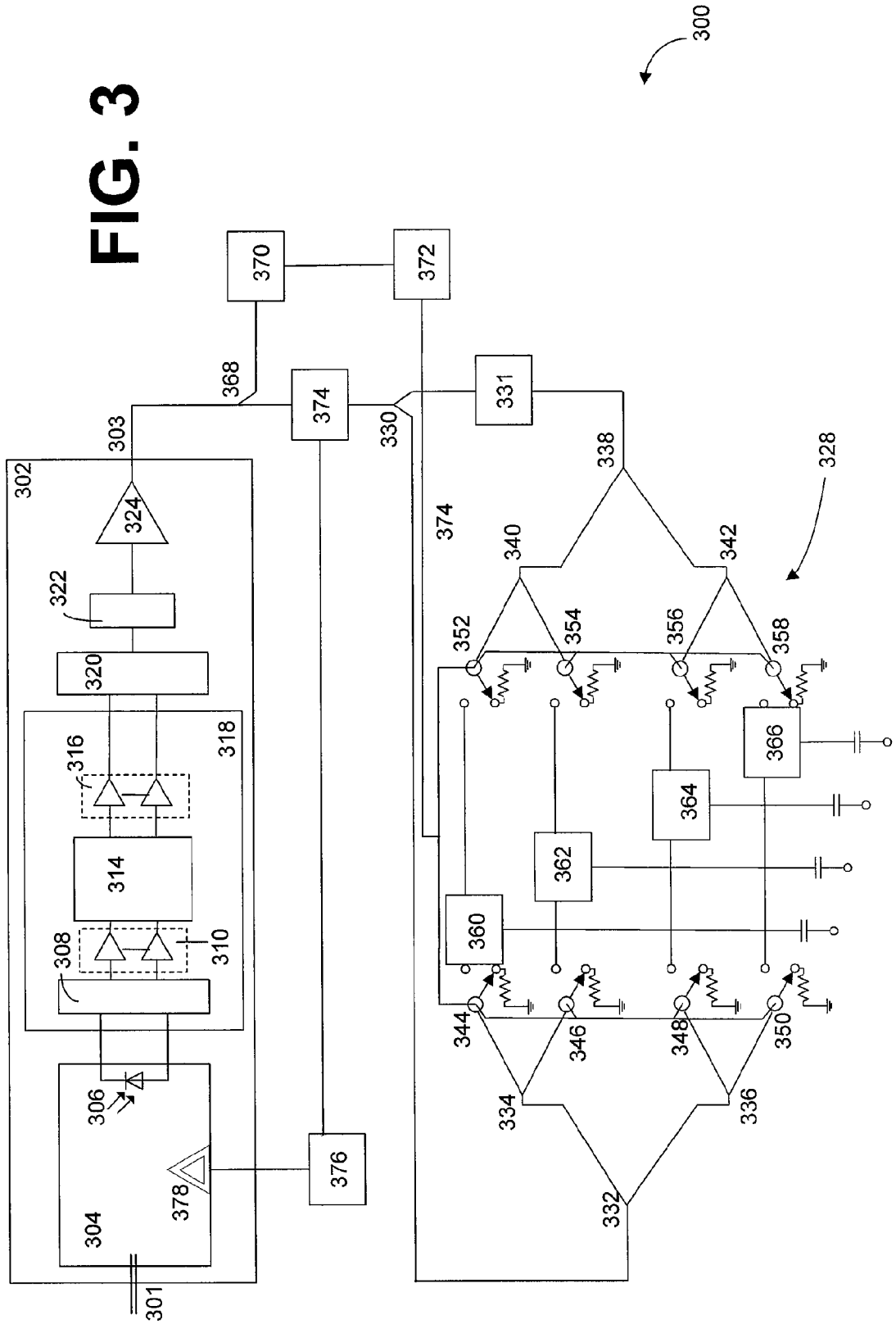
FIG. 3 is a schematic diagram of an exemplary embodiment of the converter and smart tap of FIG. 2 with a burst mode gateway upstream link.

An alternative embodiment to the fiber to RF converter and smart multitap is provided in FIG. 3. FIG. 3 depicts an embodiment of fiber to RF converter and smart multitap system 300 that can be used at a business, educational facility, or MDU, in the cable head end 110 (or decoder 116, etc.) of FIG. 1. The fiber to RF converter and smart tap system 300 comprises fiber to RF converter 302 and smart multitap 328. A fiber to multiple dwelling unit embodiment may be utilized in a customer premise device for condominiums, apartment complexes, and other high density areas. A normal fiber to the home connection with one home may comprise fiber to RF converter 302. However, using multiple converters 302 is expensive for a multiple dwelling unit due to the increased number of fibers and fiber to RF converters required to feed each individual unit at an MDU location. The smart tap shown includes four terminals, however, any number of taps could be configured. For example, 4 taps, 8 taps, 12 taps, 16 taps, etc.

Fiber to RF converter 302 comprises fiber optic input 301 and RF output 303. Photodiode 306 receives a signal from fiber optic input 301 where it is then converted to an RF signal. The RE signal is conditioned for output in signal conditioning block 318, which includes bias stage 308, pre-amp stage 310, automatic gain stage (AGC) stage 314, and interstage-amp gain stage 316. The amplifier stages may comprise push-pull amplifiers, linear amplifiers, digital amplifiers, or other means of amplification known now or later developed. The RF signal is biased by bias network 308 and amplified in pre-amp stage 310. AGC is applied at gain control stage 314 and the signal is again amplified at interstage amp stage 316. Transformer 320 then takes the output of push-pull interstage amp 316 to generate the RF signal. Tilt stage 322 applies a tilt to the signal, and output gain stage 324 applies a final amplification to the signal where it is presented at RF output 303.

An advantage of using fiber optics follows from a constant level of loss/frequency compared to different levels of loss/frequency for other media. For instance, in fiber optics, there's a single wavelength sent through the fiber. So losses occur, but the losses are constant because the signals are transmitted on a single wavelength. In a cable television (CATV) system, each TV channel is transmitted on a different frequency. Channel 2 may be transmitted at 55.25 MHz, for example, while channel 110 may be transmitted at 745.25 MHz. For each channel in a typical CATV system, there may be 6 MHz between successive channels. So, for example, for a CATV system with one hundred and ten channels, the total bandwidth of the TV system is 6 multiplied by 110 channels added to the frequency that the lowest channel is transmitted on plus any offset due to FM radio and over the air channel spacing. Through a coaxial cable, higher frequencies attenuate at a higher rate than lower frequencies. Therefore, a cable-shape loss occurs. Since the cable looks like a low pass filter, as the signal travels down the coaxial cable, a loss occurs proportional to the length of the cable. When the signal propagates through tilt stage 322 of converter 302, it is uptilted such that a higher frequency signal is attenuated less than a lower frequency signal. Adding the uptilt from tilt 322 to the downtilt from the cable produces a flat overall response. Tilt stage 322 counteracts for the cable loss. Tilt stage 322 may be implemented in one of many circuits known the art. Some gain is sacrificed in tilt stage 322 but the result is a flat signal response.

Smart multitap 328 includes receiver 370, processor 372, splitters 330, 332, 334, 336, 338, 340, and 342, switches 352, 354, 356, 358, 344, 346, 348, 350, and terminals 360, 362, 364, and 366. Switch pairs 352 and 344, 354 and 346, 356 and 348, and 358 and 350 may each be embodied in a single switch. Receiver 370 includes a bandpass filter to filter a control signal from RP output 303. This control signal is tapped off of RF output 303 at coupler 368. The control signal is then sent from receiver 370 to processor 372 to determine which of terminals 360, 362, 364, and 366 should receive the RF signal. The RF signal progresses through splitter 330, which routes the RF signal into one of two directions. One path goes to splitter 332 while the other path passes through filter 331 and then to splitter 338. Filter 331 may be used to filter signals that individual customers have not subscribed to.

For example CATV systems have multiple levels of service; they may have a digital tier versus an all analog tier; they may have pay per view or even digital Internet traffic. Accordingly, filter 331 allows a system operator to remotely enable what services a customer receives. From splitter 332 and 338 the RF signal proceeds through several splitters to create twice the number of feeds as terminals 360, 362, 364 and 366. A single RF feed from the non filtered side and a single feed from the filtered side of splitter 330 emerge from the final set of splitters. Each RF feed, filtered and non-filtered, enters switches 352, 354, 356 and 358. Each switch 352, 354, 356, 358 receives a command from processor 372 directing it to either use the filtered or non-filtered RF feed. The specific RF feed chosen by processor 372 emerges from the common port of the switches 352, 354, 356 and 358 and exits the multitap through terminals 360, 362, 364 and 366. Switches 352, 354, 356 and 358 also may be terminated via the processor 372. This is useful for, among other possibilities, disabling a customer who no longer lives in a residence without having to send a technician to turn off the RF feed, or to test for ingress from specific locations that could be degrading system performance.

In one embodiment, the fiber to RF converter and smart multitap application uses multiple wavelength optical signals to accomplish transmission of video, voice, and data. The receiver may comprise several stages, most of which can be implemented in different ways. Photodiode 306 can be a stand-alone photodiode if, for example, external wavelength division multiplex components are used. In some embodiments, such as that shown in FIG. 3, the photodiode 306 may be enclosed in a diplexer 304 or triplexer which may include other wavelength division optical components.

Photodiode 306 may be biased in a number of ways. In an exemplary embodiments, the biasing may be accomplished through the bias network 308, which also may serve to improve receiver noise performance. Other options include biasing photodiode 306 directly and using a high impedance preamplifier stage such as preamplifier stage 310 to act as the amplification and matching network for improved noise capability. Preamplifier stage 310 may match photodiode 306 to a lower output impedance. Pre-amp stage 310 and interstage amplifier stage 316 may be co-located into a single integrated circuit, or they may be separate. Interstage amp stage 316 may, for example, provide sufficient gain for smart multitap 328 to drive a home network comprising a four-way splitter and nominal system coaxial cable loss. The final output impedance of terminals 360, 362, 364, and 366 may be 75 ohms, which is typical for an in-home distribution network.

Amplifiers 310 and 316 of signal conditioning block 318 may be push-pull circuits, but also could be single-ended stages, if their linearity performance is sufficient. This could eliminate some transformers, thereby reducing costs. If the input noise performance of preamplifier stage 310 is low, cost may be reduced by eliminating the bias network 308 and by biasing photodiode 306 through RF chokes.

Signal conditioning network 318 compensates for a potentially wide input optical power or for variations in the channel loading from head end 110. An open loop compensation stage is incorporated to compensate for a signal derived from a sense line from photodiode 306. The optical input power is sensed, and a predetermined back-off is set to maintain an acceptable output signal level from terminals 360, 363, 364, and 366. In this way, installation may be simplified, as there is no need to set the output RF level. A 10 db variation in input optical power may result in a 20 db variation in RF level (prior to the gain control block 318), which is excessive for television 118 and set top terminal 116. The predetermined back-off approach is used if an optical modulation index (OMI) is known, and is constant.

A more sophisticated gain control option may include a linear gain control circuit that is driven from an RF detection circuit. The detected level could be used in a closed loop automatic gain control function, which would be useful if the OMI is not known. This gain control circuit regulates the gain based on the power level it receives from the RF detector to maintain a constant level at RF output 303. Since OMI can change as a function of channel loading, closed loop control is more effective for systems that evolve over time. The location of gain control circuit 314 is shown between pre-amplifier stage 310 and interstage amplifier stage 316, but could be placed between interstage amplifier stage 316 and output gain stage 324. Positioning gain control circuit 314 between input stage amplifier 310 and interstage amplifier 316 may reduce the linearity requirements of the interstage and post amplifiers 316 and 324. However, it degrades the noise performance and potentially adds costs due to the need for additional transformers 320.

A less expensive automatic gain control approach involves limiting the gain variability to 0 db loss or 10 db loss. The threshold point can be adjusted to optimize noise performance, keeping RF output levels within allowable limits. Adding hysteresis to the control circuitry may eliminate an oscillatory state around the threshold point.

A feature of fiber optic to RF converter and smart multitap 300 is a configurable number of ports offered from one fiber optic line. Smart multitap may provide non-limiting examples of 4, 8, 12, and 16-way capabilities. The smart multitap is not limited to any number of port configurations. Converter and multitap 300 also provide several video conditioning options, full service, tiered, and/or filter services, and the capability to turn off individual ports. The filtered and off state services provide high insulation to prevent video theft.

Another feature of fiber to RF converter and smart multitap 300 is remote enabling capability. The service provider can control the services provided through smart multitap 328. It could provide on (full service), tiered (through the use of the tiering filter capability of the smart multitap section), and off (disable the video) remotely through the network using a signal generated at head end 110 and deciphered by control signal receiver 370 in smart multitap 328. The enabling information is then sent to processor 372 which enables switches 352, 354, 356, and 358 in smart multitap 328 to select which of terminals 360, 362, 364, and 366 is to receive the RF signal.

An alternative embodiment would include processor 372 being fed signals from an alternate optical wavelength path that feeds an internal or external controller that would send the enabling information either directly to the switches or to processor 372 to control the switches as in the tap configuration of FIG. 3. This communication uses alternate wavelength signals present on the fiber, which provide a bidirectional digital signal path (used for data and voice communication, as well as control functions). In addition, external controller switches may be provided into the data stream providing full control of processor 372.

Diplex filter 374 allows the downstream signal from RF output 303 through a high pass filter in diplex filter 374 down to signal splitter 330. The low pass portion of diplex filter 374 also allows the upstream signal from the tap network to an upstream signal regulator, shown in FIG. 3 as a burst mode gateway 376, to be sent by laser 378 onto the fiber optic cable. The burst mode gateway 376 may disable the upstream transmission when it is not being used. When an upstream transmission is not being used, for example, in the middle of the night when upstream transmissions are infrequent, the burst mode gateway 376 can turn off laser 378. Therefore, no additional bandwidth is being used by an upstream transmission and noise contributed by laser 378 is reduced from the optical path. The fiber to RF converter and smart multitap 300 contains a reverse path back to the headend in order to provide interactivity which can be accomplished in many ways. In one embodiment, a reverse gain block feeds a signal up a reverse path through the diplex filter 374 and burst mode gateway 376 to video or digital laser 378 and uses a wavelength other than the one used by the downstream converter as a single return path.

Figure 4:
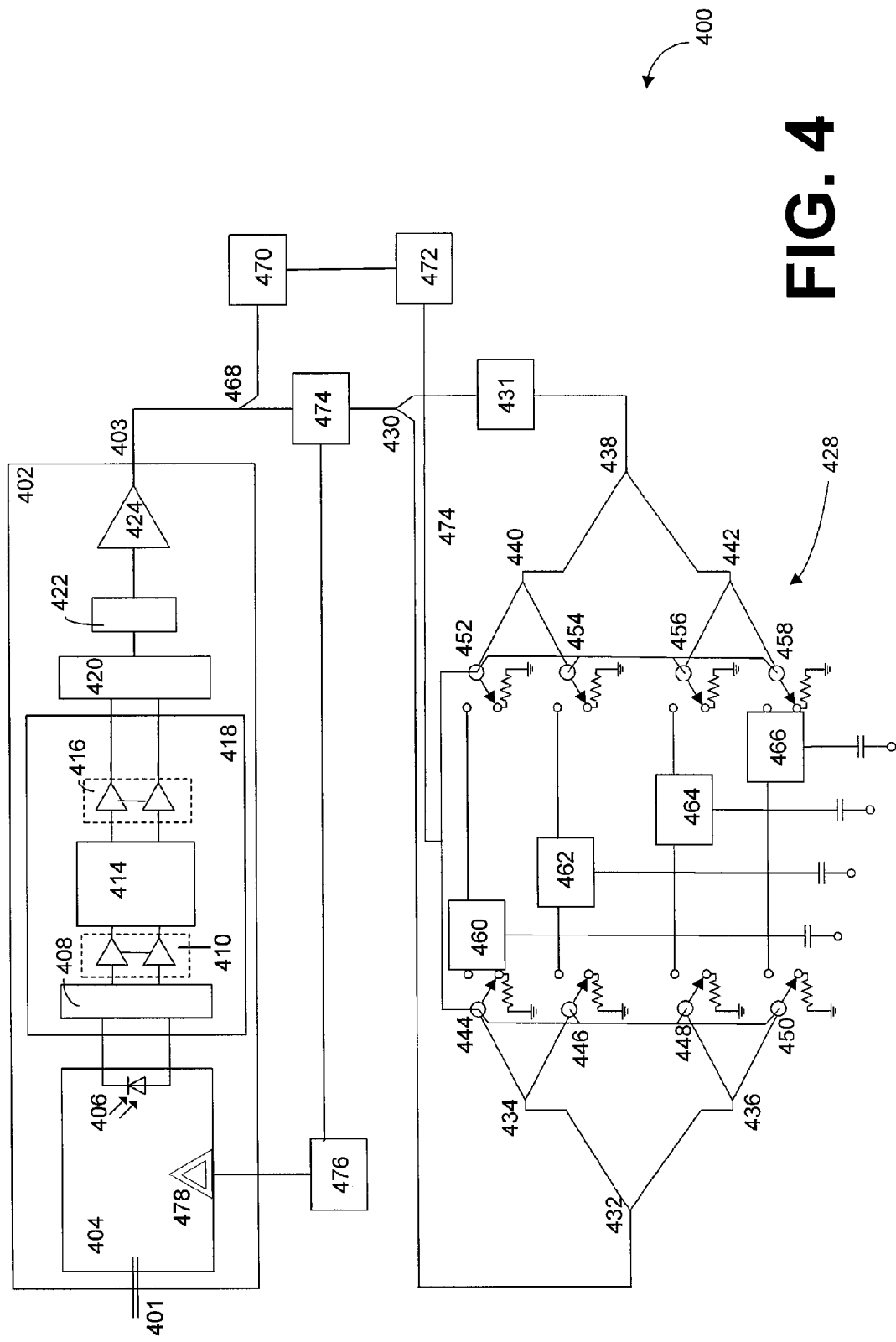
FIG. 4 is a schematic diagram of an exemplary embodiment of the fiber optic to RF converter and smart multitap of FIG. 3 with a broadband digital reverse upstream link.

In an alternative embodiment, FIG. 4 depicts an embodiment of fiber to RF converter and smart multitap system 400 that can be used at a business, educational facility, or MDU, in the cable head end 110 (or decoder 116, etc.) of FIG. 1. The fiber to RF converter and smart tap system 400 comprises fiber to RF converter 402 and smart multitap 428. A fiber to multiple dwelling unit embodiment may be utilized in a customer premise device for condominiums, apartment complexes, and other high density areas. A normal fiber to the home connection with one home is just fiber to RF converter 402. However, using multiple converters 402 is expensive for a multiple dwelling unit due to the increased number of fibers and fiber to RF converters required to feed each individual unit at an MDU location. The smart tap shown includes four terminals, however, any number of taps could be configured. For example, 4 taps, 8 taps, 12 taps, 16 taps, etc.

Fiber to RF converter 402 comprises fiber optic input 401 and RF output 403. Photodiode 406 receives a signal from fiber optic input 401 where it is then converted to an RF signal. The RF signal is conditioned for output in signal conditioning block 418, which includes bias stage 408, pre-amp stage 410, automatic gain control (AGC) stage 414, and interstage-amp gain stage 416. The amplifier stages may comprise push-pull amplifiers, linear amplifiers, digital amplifiers, or other means of amplification known now or later developed. The RF signal is biased by bias network 408 and amplified in pre-amp stage 410. AGC is applied at gain control stage 414 and the signal is again amplified at interstage amp stage 416. Transformer 420 then takes the output of push-pull interstage amp 416 to generate the RF signal. Tilt stage 422 applies a tilt to the signal, and output gain stage 424 applies a final amplification to the signal where it is presented at RF output 403.

An advantage of using fiber optics follows from a constant level of loss/frequency compared to different levels of loss/frequency for other media. For instance, in fiber, there's a single wavelength sent through the filter. So losses occur, but the losses are constant because the signals are transmitted on a single wavelength. In a cable television (CATV) system, each TV channel is transmitted on a different frequency.

Channel 2 may be transmitted at 55.25 MHz, for example, while channel 110 may be transmitted at 745.25 MHz. For each channel in a typical CATV system, there may be 6 MHz between successive channels. So, for example, for a CATV system with one hundred and ten channels, the total bandwidth of the TV system is 6 multiplied by 110 channels added to the frequency that the lowest channel is transmitted on plus any offset due to FM radio and over the air channel spacing. Through a coaxial cable, higher frequencies attenuate at a higher rate than lower frequencies. Therefore, a cable-shape loss occurs. Since the cable looks like a low pass filter, as the signal travels down the coaxial cable, a loss occurs proportional to the length of the cable. When the signal propagates through tilt stage 422 of converter 402, it is uptilted such that a higher frequency signal is attenuated less than a lower frequency signal. Adding the uptilt from tilt 422 to the downtilt from the cable produces a flat overall response. Tilt stage 422 counteracts for the cable loss. Tilt stage 422 may be implemented in one of many circuits known the art. Some gain is sacrificed in tilt stage 422 but the result is a flat signal response.

Smart multitap 428 includes receiver 470, processor 472, splitters 430, 432, 434, 436, 438, 440, and 442, switches 452, 454, 456, 458, 444, 446, 448, 450, and terminals 460, 462, 464, and 466. Switch pairs 452 and 444, 454 and 446, 456 and 448, and 458 and 450 may each be embodied in a single switch. Receiver 470 includes a bandpass filter to filter a control signal from RF output 403. This control signal is tapped off of RF output 403 at coupler 468. The control signal is then sent from receiver 470 to processor 472 to determine which of terminals 460, 462, 464, and 466 should receive the RF signal. The RF signal progresses through splitter 430, which routes the RF signal into one of two directions. One path goes to splitter 432 while the other path passes through filter 431 and then to splitter 438. Filter 431 may be used to filter signals that individual customers have not subscribed to.

For example CATV systems have multiple levels of service; they may have a digital tier versus an all analog tier; they may have pay per view or even digital internet traffic. Accordingly, filter 431 allows a system operator to remotely enable what services a customer receives. From splitter 432 and 438 the RF signal proceeds through several splitters to create twice the number of feeds as terminals 460, 462, 464 and 466. A single RF feed from the non filtered side and a single feed from the filtered side of splitter 430 emerge from the final set of splitters. Each RF feed, filtered and non-filtered, enters switches 452, 454, 456 and 458. Each switch 452, 454, 456, 458 receives a command from processor 472 directing it to either use the filtered or non-filtered RF feed. The specific RF feed chosen by processor 472 emerges from the common port of the switches 452, 454, 456 and 458 and exits the multitap through terminals 460, 462, 464 and 466. Switches 452, 454, 456 and 458 also may be terminated via the processor 472. This is useful for, among other possibilities, disabling a customer who no longer lives in a residence without having to send a technician to turn off the RF feed, or to test for ingress from specific locations that could be degrading system performance.

In one embodiment, the fiber to RF converter and smart multitap application uses multiple wavelength optical signals to accomplish transmission of video, voice, and data. The receiver may comprise several stages, most of which can be implemented in different ways. Photodiode 406 can be a stand-alone photodiode if, for example, external wavelength division multiplex components are used. In some embodiments, such as that shown in FIG. 4, the photodiode 406 may be enclosed in a diplexer 404 or triplexer which may include other wavelength division optical components.

Photodiode 406 may be biased in a number of ways. In an exemplary embodiments, the biasing may be accomplished through bias network 408, which also may serve to improve receiver noise performance. Other options include biasing photodiode 406 directly and using a high impedance preamplifier stage such as preamplifier stage 410 to act as the amplification and matching network for improved noise capability. Preamplifier stage 410 may match photodiode 406 to a lower output impedance. Pre-amp stage 410 and interstage amplifier stage 416 may be co-located into a single integrated circuit, or they may be separate. Interstage amp stage 416 may, for example, provide sufficient gain for smart multitap 428 to drive a home network comprising a four-way splitter and nominal system coaxial cable loss. The final output impedance of terminals 460, 462, 464, and 466 may be 75 ohms, which is typical for an in-home distribution network.

Amplifiers 410 and 416 of signal conditioning block 418 may be push-pull circuits, but also could be single-ended stages, if their linearity performance is sufficient. This could eliminate some transformers, thereby reducing costs. If the input noise performance of preamplifier stage 410 is low, cost may be reduced by eliminating the bias network 408 and by biasing photodiode 406 through RF chokes.

Signal conditioning network 418 compensates for a potentially wide input optical power or for variations in the channel loading from head end 110. An open loop compensation stage is incorporated to compensate for a signal derived from a sense line from photodiode 406. The optical input power is sensed, and a predetermined back-off is set to maintain an acceptable output signal level from terminals 460, 463, 464, and 466. In this way, installation may be simplified, as there is no need to set the output RF level. A 10 db variation in input optical power may result in a 20 db variation in RF level (prior to the gain control block 418), which is excessive for television 118 and set top terminal 116. The predetermined back-off approach is used if an optical modulation index (OMI) is known, and is constant.

A more sophisticated gain control option may include a linear gain control circuit that is driven from an RF detection circuit. The detected level could be used in a closed loop automatic gain control function, which would be useful if the OMI is not known. This gain control circuit regulates the gain based on the power level it receives from the RE detector to maintain a constant level at RF output 403. Since OMI can change as a function of channel loading, closed loop control is more effective for systems that evolve over time. The location of gain control circuit 414 is shown between pre-amplifier stage 410 and interstage amplifier stage 416, but could be placed between interstage amplifier stage 416 and output gain stage 424. Positioning gain control circuit 414 between input stage amplifier 410 and interstage amplifier 416 may reduce the linearity requirements of the interstage and post amplifiers 416 and 424. However, it degrades the noise performance and potentially adds costs due to the need for additional transformers 420.

A less expensive automatic gain control approach involves limiting the gain variability to 0 db loss or 10 db loss. The threshold point can be adjusted to optimize noise performance, keeping RF output levels within allowable limits. Adding hysteresis to the control circuitry may eliminate an oscillatory state around the threshold point.

A feature of fiber optic to RF converter and smart multitap 400 is a configurable number of ports offered from one fiber optic line. Smart multitap may provide non-limiting examples of 4, 8, 12, and 16-way capabilities. The smart multitap is not limited to any number of port configurations. Converter and multitap 400 also provide several video conditioning options, full service, tiered, and/or filter services, and the capability to turn off individual ports. The filtered and off state services provide high insulation to prevent video theft.

Another feature of fiber to RF converter and smart multitap 400 is remote enabling capability. The service provider can control the services provided through smart multitap 428. It could provide on (full service), tiered (through the use of the tiering filter capability of the smart multitap section), and off (disable the video) remotely through the network using a signal generated at head end 110 and deciphered by control signal receiver 470 in smart multitap 428. The enabling information is then sent to processor 472 which enables switches 452, 454, 456, and 458 in smart multitap 428 to select which of terminals 460, 462, 464, and 466 is to receive the RF signal.

An alternative embodiment would include processor 472 being fed signals from an alternate optical wavelength path that feeds an internal or external controller that would send the enabling information either directly to the switches or to processor 472 to control the switches as in the tap configuration of FIG. 4. This communication uses alternate wavelength signals present on the fiber, which provide a bidirectional digital signal path (used for data and voice communication, as well as control functions). In addition, external controller switches may be provided into the data stream providing full control of processor 472.

Diplex filter 474 allows the downstream signal from RF output 403 through a high pass filter in the diplex filter 474 down to the signal splitter 430. The low pass portion of the diplex filter 474 also allows the upstream signal from the tap network to an upstream signal regulator, shown in FIG. 4 as a broadband digital reverse (BDR) unit 476, to be sent by a laser 478 onto the fiber optic cable. The BDR unit 476 digitally integrates the upstream transmission on a separate wavelength. The burst mode gateway reverse does not transmit back upstream unless there is a signal present. For example, at three o'clock in the morning, when no consumer is occupying upstream bandwidth, the data stream is disabled so that if another customer is occupying bandwidth, they get more throughput. FIG. 2 is an entirely downstream implementation. Commands can be sent downstream and receiver 370 picks off the information from coupler 368. For the burst mode gateway, cost and reliability are of more concern. The technology is newer and has its own limitations.

BDR 476 is something that most cable companies already use in the head end. The burst mode gateway would be used better in areas where there is a high concentration of ingress coming from interstates or industrial areas with propagation of noise problems. Also, the burst mode gateway has a limitation on a number of users. The more uses, the less viable the technology. An advantage of the burst mode gateway includes turning off its laser when signal is not present. With more users, the likelihood of a use occupying bandwidth increases, reducing the effectiveness of the burst mode gateway. The BDR 476 digitizes the upstream signal and makes the upstream signal less susceptible to ingress, but it continues to run all the time whereas the burst mode gateway will shut down the laser at certain times under certain conditions. Since the lifetime of the laser is based on its usage, that particular module may last longer in the burst mode gateway embodiment.

Figure 5:
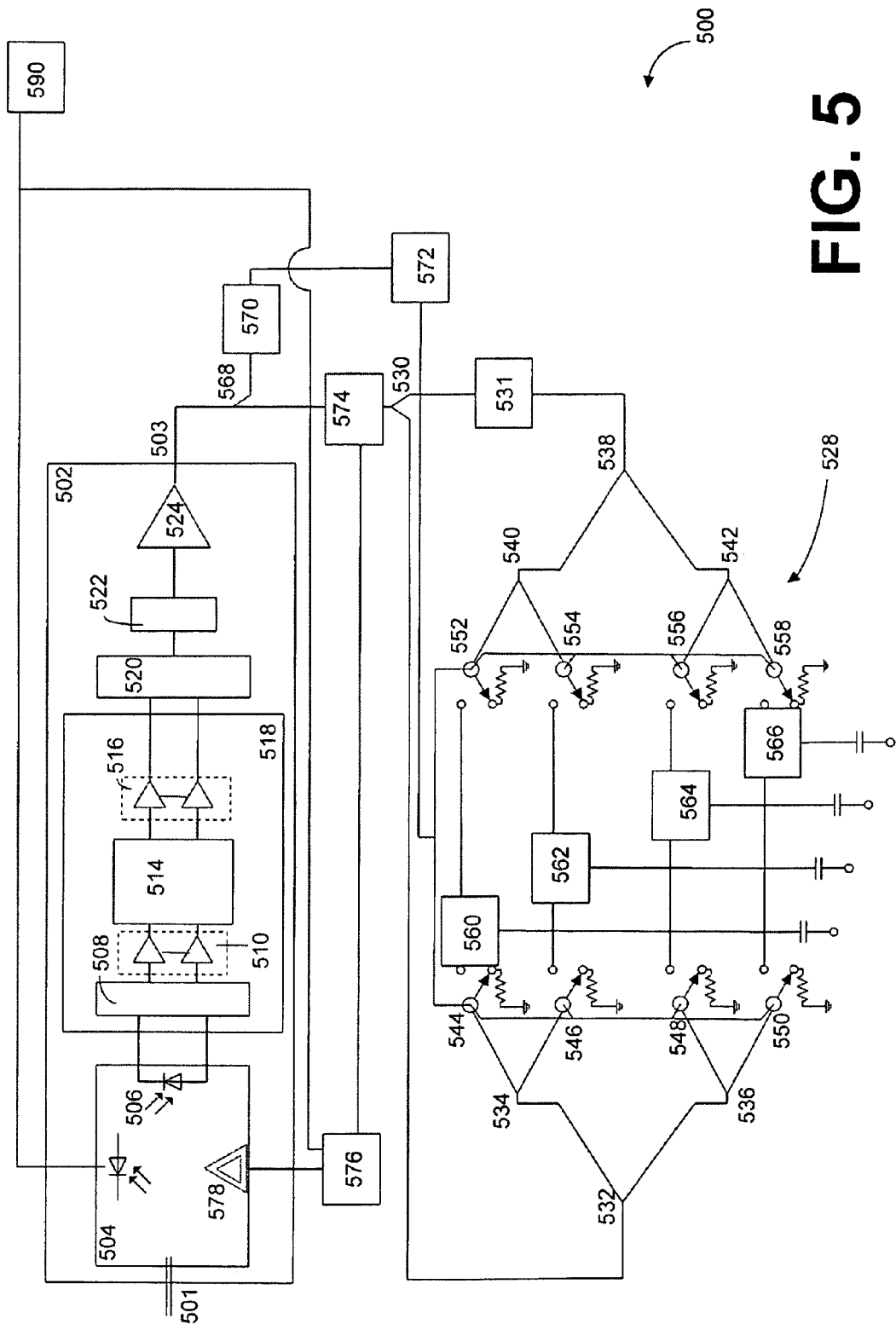
FIG. 5 is a schematic diagram of an exemplary embodiment of the fiber optic to RF converter and smart multitap of FIG. 2 with digital forward and reverse provided through an optical network terminal.

In an alternative embodiment, FIG. 5 depicts an embodiment of fiber to RF converter and smart multitap system 500 that can be used at a business, educational facility, or MDU, in the cable head end 110 (or decoder 116, etc.) of FIG. 1. The fiber to RF converter and smart tap system 500 comprises fiber to RF converter 502 and smart multitap 528. A fiber to multiple dwelling unit embodiment may be utilized in a customer premise device for condominiums, apartment complexes, and other high density areas. A normal fiber to the home connection with one home may comprise fiber to RF converter 502. However, using multiple converters 502 is expensive for a multiple dwelling unit due to the increased number of fibers and fiber to RF converters required to feed each individual unit at an MDU location. The smart tap shown includes four terminals, however, any number of taps could be configured. For example, 4 taps, 8 taps, 12 taps, 16 taps, etc.

Fiber to RF converter 502 comprises fiber optic input 501 and RF output 503. Photodiode 506 receives a signal from fiber optic input 501 where it is then converted to an RF signal. The RF signal is conditioned for output in signal conditioning block 518, which includes bias stage 508, pre-amp stage 510, automatic gain control (AGC) stage 514, and interstage-amp gain stage 516. The amplifier stages may comprise push-pull amplifiers, linear amplifiers, digital amplifiers, or other means of amplification known now or later developed. The RF signal is biased by bias network 508 and amplified in pre-amp stage 510. AGC is applied at gain control stage 514 and the signal is again amplified at interstage amp stage 516. Transformer 520 then takes the output of push-pull interstage amp 516 to generate the RF signal. Tilt stage 522 applies a tilt to the signal, and output gain stage 524 applies a final amplification to the signal where it is presented at RF output 503.

An advantage of using fiber optics follows from a constant level of loss/frequency compared to different levels of loss/frequency for other media. For instance, in fiber optics, there's a single wavelength sent through. So losses occur, but the losses are constant because the signals are transmitted on a single wavelength. In a cable television (CATV) system, each TV channel is transmitted on a different frequency. Channel 2 may be transmitted at 55.25 MHz, for example, while channel 110 may be transmitted at 745.25 MHz. For each channel in a typical CATV system, there may be 6 MHz between successive channels. So, for example, for a CATV system with one hundred and ten channels, the total bandwidth of the TV system is 6 multiplied by 110 channels added to the frequency that the lowest channel is transmitted on plus any offset due to FM radio and over the air channel spacing. Through a coaxial cable, higher frequencies attenuate at a higher rate than lower frequencies. Therefore, a cable-shape loss occurs. Since the cable looks like a low pass filter, as the signal travels down the coaxial cable, a loss occurs proportional to the length of the cable. When the signal propagates through tilt stage 522 of converter 502, it is uptilted such that a higher frequency signal is attenuated less than a lower frequency signal. Adding the uptilt from tilt 522 to the down-tilt from the cable produces a flat overall response. Tilt stage 522 counteracts for the cable loss. Tilt stage 522 may be implemented in one of many circuits known the art. Some gain is sacrificed in tilt stage 522 but the result is a flat signal response.

Smart multitap 528 includes receiver 570, processor 572, splitters 530, 532, 534, 536, 538, 540, and 542, switches 552, 554, 556, 558, 544, 546, 548, 550, and terminals 560, 562, 564, and 566. Switch pairs 552 and 544, 554 and 546, 556 and 548, and 558 and 550 may each be embodied in a single switch. Receiver 570 includes a bandpass filter to filter a control signal from RF output 503. This control signal is tapped off of RF output 503 at coupler 568. The control signal is then sent from receiver 570 to processor 572 to determine which of terminals 560, 562, 564, and 566 should receive the RF signal. The RF signal progresses through splitter 530, which routes the RF signal into one of two directions. One path goes to splitter 532 while the other path passes through filter 531 and then to splitter 538. Filter 531 may be used to filter signals that individual customers have not subscribed to.

For example CATV systems have multiple levels of service; they may have a digital tier versus an all analog tier; they may have pay per view or even digital internet traffic. Accordingly, filter 531 allows a system operator to remotely enable what services a customer receives. From splitter 532 and 538 the RF signal proceeds through several splitters to create twice the number of feeds as terminals 560, 562, 564 and 566. A single RF feed from the non filtered side and a single feed from the filtered side of splitter 530 emerge from the final set of splitters. Each RF feed, filtered and non-filtered, enters switches 552, 554, 556 and 558. Each switch 552, 554, 556, 558 receives a command from processor 572 directing it to either use the filtered or non-filtered RF feed. The specific RF feed chosen by processor 572 emerges from the common port of the switches 552, 554, 556 and 558 and exits the multitap through terminals 560, 562, 564 and 566. Switches 552, 554, 556 and 558 also may be terminated via the processor 572. This is useful for, among other possibilities, disabling a customer who no longer lives in a residence without having to send a technician to turn off the RF feed, or to test for ingress from specific locations that could be degrading system performance.

In one embodiment, the fiber to RF converter and smart multitap application uses multiple wavelength optical signals to accomplish transmission of video, voice, and data. The receiver may comprise several stages, most of which can be implemented in different ways. Photodiode 506 can be a stand-alone photodiode if, for example, external wavelength division multiplex components are used. In some embodiments, such as that shown in FIG. 5, the photodiode 506 may be enclosed in a triplexes 504 which may include other wavelength division optical components.

Photodiode 506 may be biased in a number of ways. In an exemplary embodiments, the biasing may be accomplished through bias network 508, which also may serve to improve receiver noise performance. Other options include biasing photodiode 506 directly and using a high impedance preamplifier stage such as preamplifier stage 510 to act as the amplification and matching network for improved noise capability. Preamplifier stage 510 may match photodiode 506 to a lower output impedance. Pre-amp stage 510 and interstage amplifier stage 516 may be co-located into a single integrated circuit, or they may be separate. Interstage amp stage 516 may, for example, provide sufficient gain for smart multitap 528 to drive a home network comprising a four-way splitter and nominal system coaxial cable loss. The final output impedance of terminals 560, 562, 564, and 566 may be 75 ohms, which is typical for an in-home distribution network.

Amplifiers 510 and 516 of signal conditioning block 518 may be push-pull circuits, but also could be single-ended stages, if their linearity performance is sufficient. This could eliminate some transformers, thereby reducing costs. If the input noise performance of preamplifier stage 510 is low, cost may be reduced by eliminating an bias network 508 and by biasing photodiode 506 through RF chokes.

Signal conditioning network 518 compensates for a potentially wide input optical power or for variations in the channel loading from head end 110. An open loop compensation stage is incorporated to compensate for a signal derived from a sense line from photodiode 506. The optical input power is sensed, and a predetermined back-off is set to maintain an acceptable output signal level from terminals 560, 563, 564, and 566. In this way, installation may be simplified, as there is no need to set the output RF level. A 10 db variation in input optical power may result in a 20 db variation in RF level (prior to the gain control block 518), which is excessive for television 118 and set top terminal 116. The predetermined back-off approach is used if an optical modulation index (OMI) is known, and is constant.

A more sophisticated gain control option may include a linear gain control circuit that is driven from an RF detection circuit. The detected level could be used in a closed loop automatic gain control function, which would be useful if the OMI is not known. This gain control circuit regulates the gain based on the power level it receives from the RF detector to maintain a constant level at RF output 503. Since OMI can change as a function of channel loading, closed loop control is more effective for systems that evolve over time. The location of gain control circuit 514 is shown between pre-amplifier stage 510 and interstage amplifier stage 516, but could be placed between interstage amplifier stage 516 and output gain stage 524. Positioning gain control circuit 514 between input stage amplifier 510 and interstage amplifier 516 may reduce the linearity requirements of the interstage and post amplifiers 516 and 524. However, it degrades the noise performance and potentially adds costs due to the need for additional transformers 520.

A less expensive automatic gain control approach involves limiting the gain variability to 0 db loss or 10 db loss. The threshold point can be adjusted to optimize noise performance, keeping RF output levels within allowable limits. Adding hysteresis to the control circuitry may eliminate an oscillatory state around the threshold point.

A feature of fiber optic to RF converter and smart multitap 500 is a configurable number of ports offered from one fiber optic line. Smart multitap may provide non-limiting examples of 4, 8, 12, and 16-way capabilities. The smart multitap is not limited to any number of port configurations. Converter and multitap 500 also provide several video conditioning options, full service, tiered, and/or filter services, and the capability to turn off individual ports. The filtered and off state services provide high insulation to prevent video theft.

Another feature of fiber to RF converter and smart multitap 500 is remote enabling capability. The service provider can control the services provided through smart multitap 528. It could provide on (full service), tiered (through the use of the tiering filter capability of the smart multitap section), and off (disable the video) remotely through the network using a signal generated at head end 110 and deciphered by control signal receiver 570 in smart multitap 528. The enabling information is then sent to processor 572 which enables switches 552, 554, 556, and 558 in smart multitap 528 to select which of terminals 560, 562, 564, and 566 is to receive the RF signal.

In FIG. 5, the downstream (forward), upstream (reverse), and digital downstream implementation is similar to fiber optic Ethernet capability with video overlay. This could also be called the digital forward and reverse communication length with video overlay. This alternative embodiment would include processor 572 for processing the digital forward signals. The signals are detected on an alternate optical wavelength path. The signals, which may include enabling and/or control information, are provided either directly to the switches or to processor 572 to control the switches. This communication link uses alternate wavelength signals present on the fiber, which provides a bidirectional digital signal path (used for data and voice communication, as well as control functions). In addition, external controller switches may be provided into the data stream providing full control of processor 572.

Video overlay with forward and reverse digital capability allows for multiple vendors to provide competing services over the same fiber optic cable. This system configuration allows multiple vendors to split the initial cost of the system. The advantage of this alternative embodiment is that a customer would have a choice of the standard CATV style services and/or digital upstream and digital downstream services that potentially have increased security and bandwidth. In this embodiment, a user may have an IP based network bypassing the traditional coaxial network, using a standard Ethernet jack at terminal 590 where a user may router and hub devices for the MDU location for processing and directing the digital information. The digital information from the optical network termination (ONT) may be provided to a separate device that handles a conversion to an IP-based or Ethernet-based protocol, as non-limiting examples. This configuration is not unlike a digital modem/router with a video overlay.

In the embodiment of FIG. 5, the video overlay is provided to the terminals of the smart multitap; however, the optical digital information may or may not. In triplexer 504, there are three wavelengths of light that are different wavelengths. Exemplary wavelengths include downstream video at 1550 nanometers, the upstream/reverse video/digital at 1310 nanometers and the digital forward at 1490 nanometers. Diplex filter 574 allows the downstream signal from RF output 503 through a high pass filter in the diplex filter 574 down to the signal splitter 530. The low pass portion of the diplex filter 574 also allows the upstream signal from the tap network to an upstream signal regulator, shown in FIG. 4 as a digital reverse block 576 that handles the optical network transmission upstream signal. The output of the optical network termination terminal 590 may also be communicatively coupled to digital reverse block 576 to manage the upstream digital signal.

Figure 6:
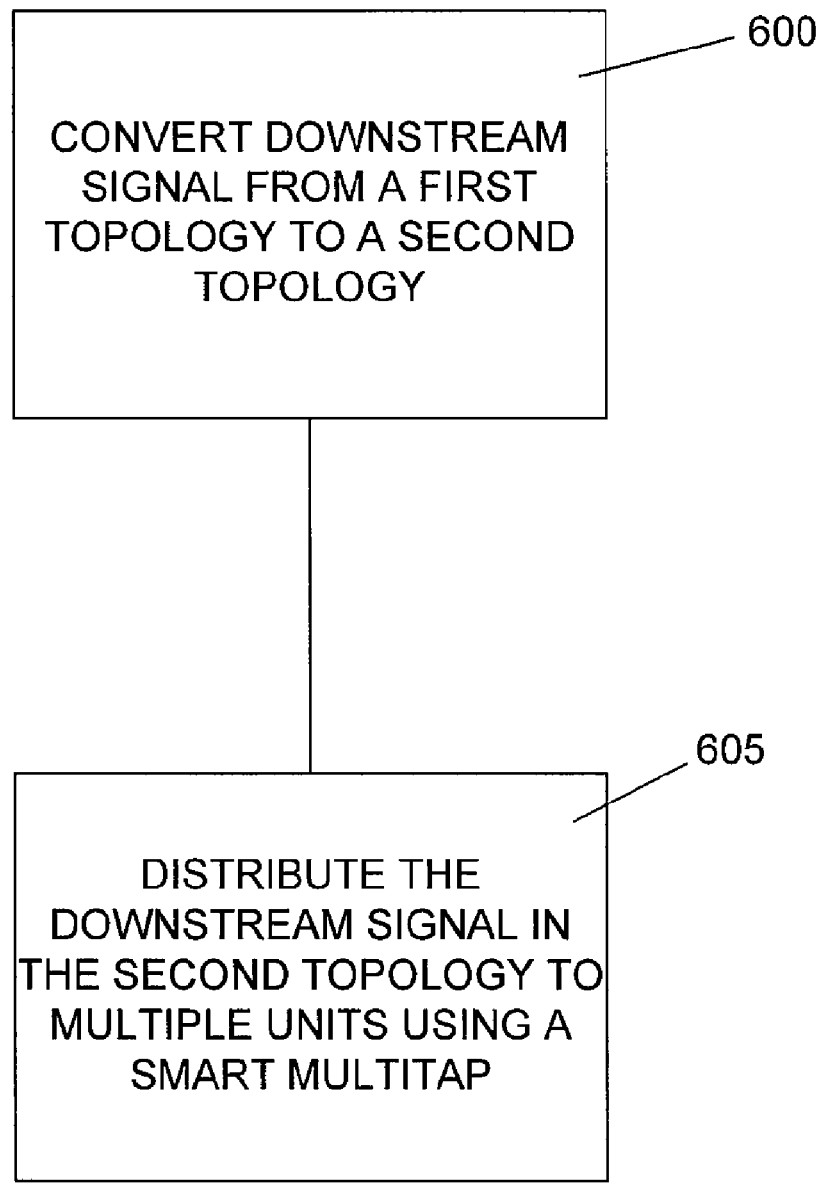
FIG. 6 is a flow diagram of an exemplary embodiment of a method for downstream transmission using the system provided in FIG. 2.

The flow diagram of FIG. 6 provides a method for downstream transmission according to the system of FIG. 2. In block 600, a signal converter converts a downstream signal from a first topology to a second topology. In an exemplary embodiment a fiber optic signal is converted to an RF signal. In block 605, the downstream signal configured according to the second topology is distributed to multiple units through a smart multitap. The particular terminal serviced with the multitap is selected by a processor, which may receive instructions by means of a control signal, as a non-limiting embodiment. The control signal may be modulated on the RF signal and received by a receiver, which demodulates the control signal for use by the processor.

Figure 7:
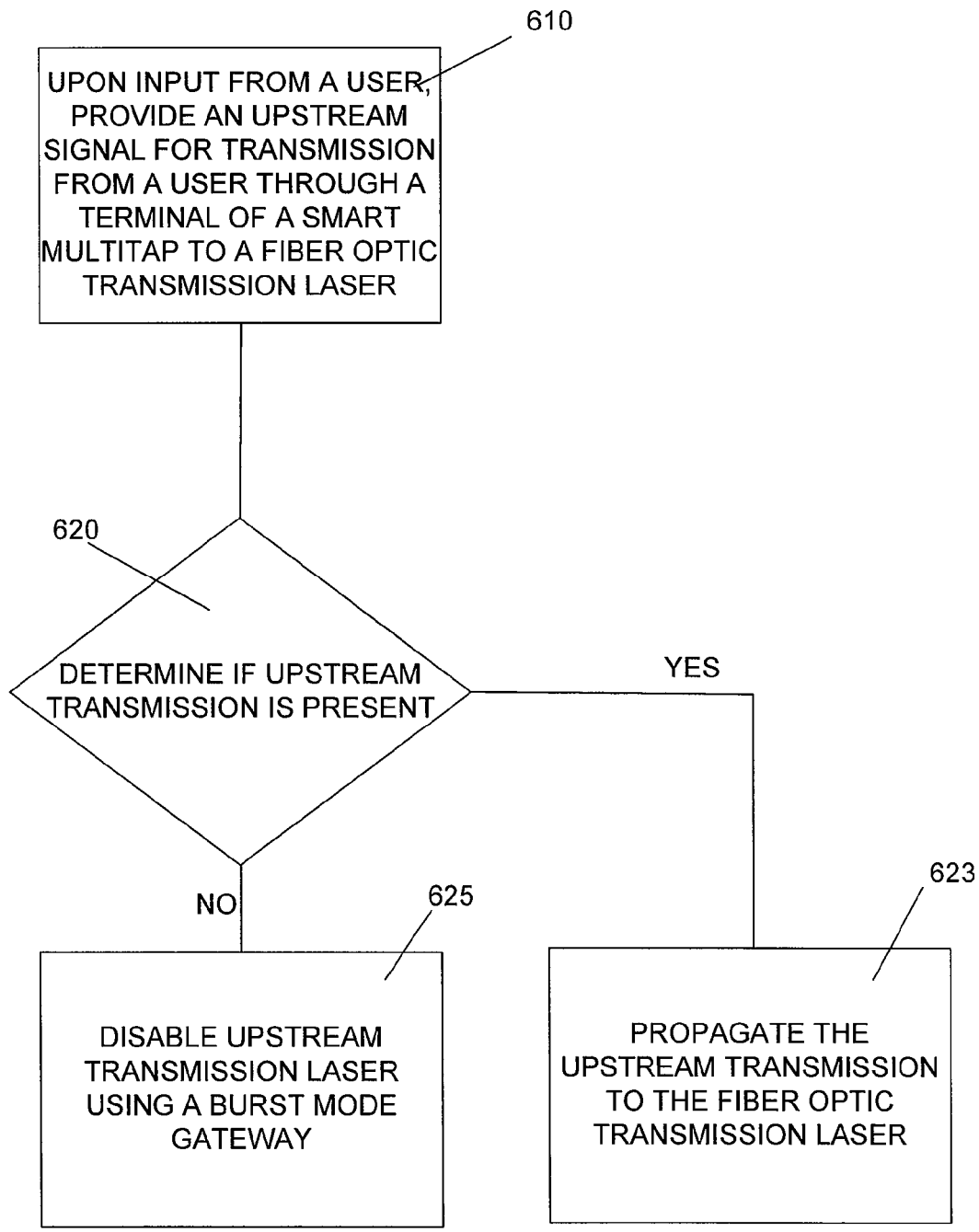
FIG. 7 is a flow diagram of an exemplary embodiment of a method for downstream and upstream transmission using the system provided in FIG. 3.

The flow diagram of FIG. 7 provides a method for downstream and upstream transmission according to the system of FIG. 3. In block 610, upon the direction of a user, an upstream signal is provided for transmission from a unit through a smart multitap to a fiber optic transmission laser. In decision block 620, a determination is made as to whether an upstream transmission is present. In block 623, if an upstream transmission is present, it is propagated to the fiber optic transmission laser. In block 625, if no upstream transmission is present, the upstream transmission laser is disabled by means of a burst mode gateway. By turning off the fiber optic transmission laser, energy is saved, the reliability (proportional to use) of the fiber optic transmission laser is increased, and the bandwidth available for upstream transmission is increased.

Figure 8:
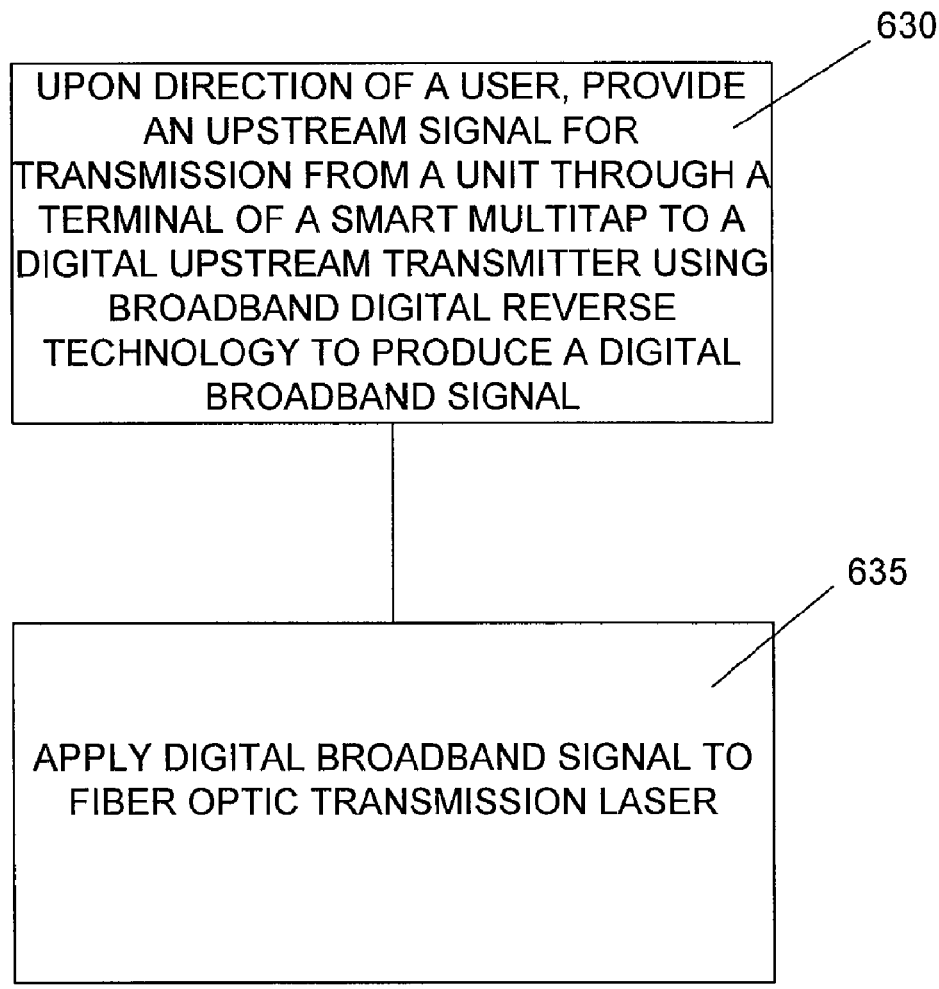
FIG. 8 is a flow diagram of an exemplary embodiment of a method for downstream and upstream transmission using the system provided in FIG. 4.

The flow diagram of FIG. 8 provides a method for downstream and upstream transmission according to the system of FIG. 4. In block 630, upon the direction of a user, an upstream signal is provided for transmission from a unit through a smart multitap to a digital upstream transmitter using broadband digital reverse technology to produce a digital broadband upstream signal. In block 635, the digital broadband upstream signal is applied to the fiber optic transmission laser.

Figure 9:
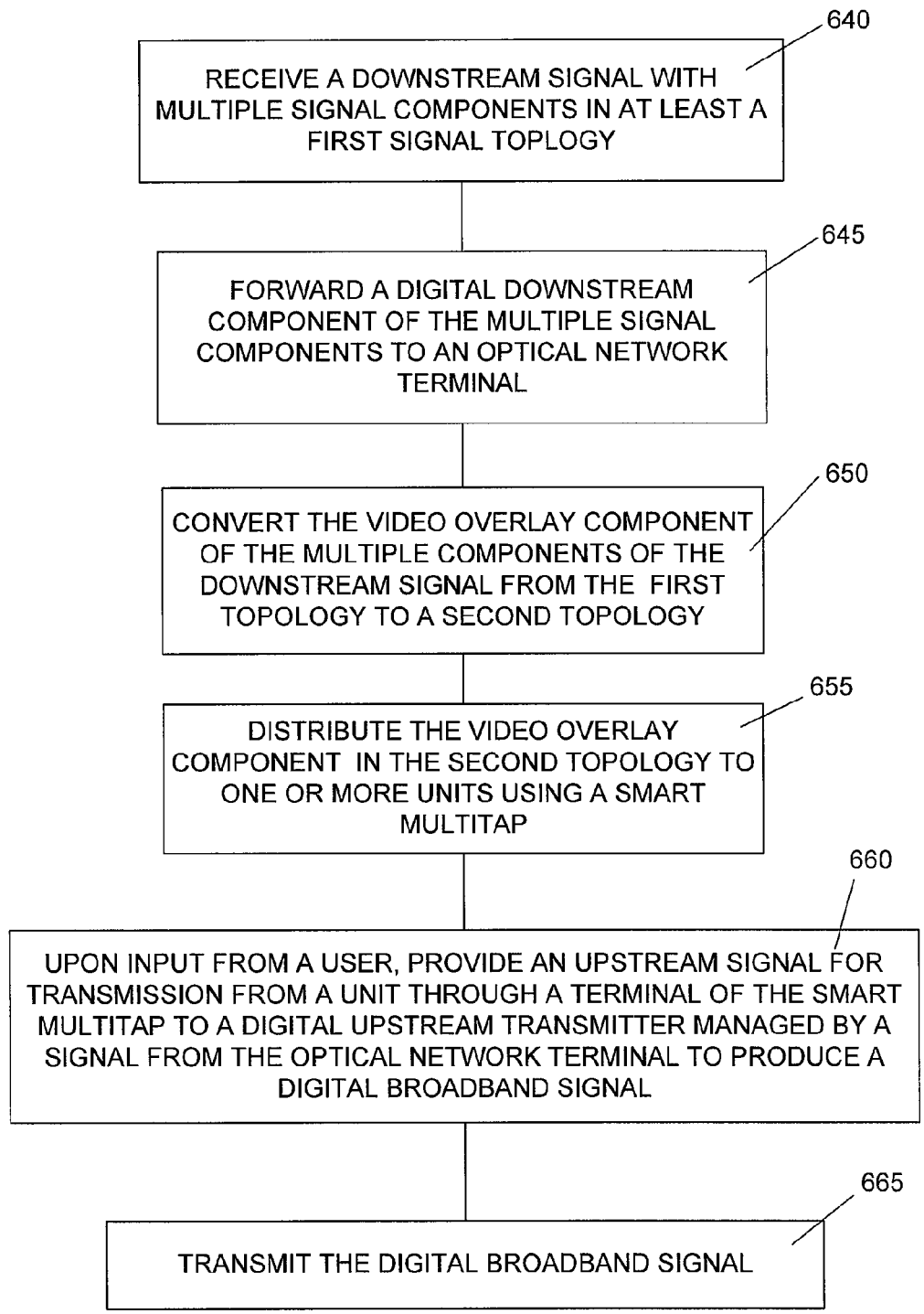
FIG. 9 is a flow diagram of an exemplary embodiment of a method for downstream and upstream transmission using the system provided in FIG. 5.

The flow diagram of FIG. 9 provides a method for downstream and upstream transmission according to the system of FIG. 5. In block 640, a downstream signal with multiple signal components in at least a first topology is received. In block 645, a digital downstream component of the multiple signal components is forwarded to an optical network terminal. In block 650, the video overlay component of the multiple components of the downstream signal in the first signal topology is converted to a second signal topology. In block 655, the resultant video overlay component in the second topology is distributed to one or more units by means of a smart multitap. In block 660, upon direction of a user, an upstream signal from a unit is provided for transmission through a terminal of the smart multitap or from the optical network terminal. The upstream signal is provided to a digital upstream transmitter. In block 665, the digital broadband signal is transmitted.

The flow diagrams of FIGS. 6-9 show the architecture, functionality, and operation software for implementing the converter and smart multitap of FIGS. 2-5. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 6-9. For example, two blocks shown in succession may in fact be executed substantially concurrently or the blocks may sometimes be executed in the reverse order, depending upon the functionality involved, as will be further clarified hereinbelow.

The software for implementing the converter and smart multitap of FIGS. 2-5, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

Conditional language, such as, among others, "can," "could," "might," or "may," unless specifically stated otherwise, or otherwise understood within the context as used, is generally intended to convey that certain embodiments could include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A system comprising:
   a module configured to convert a signal in a first format to signal in a second format, the module including a diplexer;
   a configurable multitap for splitting the signal in the second format and selectively transceiving the signal in the second format to a plurality of terminals;
   a diplex filter configured to allow upstream and downstream signals at different frequencies in the second format; and
   an upstream signal regulator electrically connected between the diplex filter and the diplexer and configured to provide the upstream signal to the diplexer for converting the upstream signal to the first format, the upstream signal regulator configured to decrease the bandwidth requirements of an upstream signal, wherein the diplexer receives the upstream signal from the upstream signal regulator.

2. The system of claim 1, wherein the first format is capable of being used over a fiber optic transmission medium.

3. The system of claim 1, wherein the second format is capable of being used over a radio frequency transmission medium.

4. The system of claim 1, further comprising a processor for selecting at least one of the plurality of terminals to receive the signal in the second format.

5. The system of claim 4, further comprising a filter for passing a control signal to the processor.

6. The system of claim 5, further comprising a demodulator configured to demodulate the control signal for use by the processor.

7. The system of claim 5, wherein the filter is a bandpass filter.

8. The system of claim 4, wherein the configurable multitap comprises:
   a plurality of switches selectively controllable by the processor; and
   a plurality of splitters communicatively coupled to the plurality of switches.

9. The system of claim 1, wherein the diplex filter comprises a high pass filter electrically connected to pass downstream signals between the module and the multitap.

10. The system of claim 1, wherein the diplex filter comprises a low pass filter electrically connected to pass upstream signals between the multitap and the diplexer.

11. The system of claim 1, wherein the upstream signal regulator comprises a burst mode gateway.

12. The system of claim 1, further comprising an upstream fiber optic transmission laser configured to apply the upstream signal to a fiber optic cable.

13. The system of claim 12, wherein the upstream signal regulator comprises a burst mode gateway.

14. The system of claim 13, wherein the burst mode gateway disables the upstream fiber optic transmission laser if no upstream signal is present.

15. The system of claim 12, wherein the upstream signal regulator comprises a module configured to digitize the upstream signal.

16. A system comprising:
   a module configured to convert a signal in a first format to signal in a second format, the module including a diplexer;
   a configurable multitap for splitting the signal in the second format and selectively transceiving the signal in the second format to a plurality of terminals;
   a diplex filter configured to allow upstream and downstream signals at different frequencies in the second format; and
   an upstream signal regulator electrically connected between the diplex filter and the diplexer, the upstream signal regulator being configured to digitize the upstream signal and provide a digitized upstream signal to the diplexer for converting the upstream signal from the second format to the first format.

17. The system of claim 16, further comprising an upstream fiber optic transmission laser configured to apply the digitized upstream signal to a fiber optic cable.

18. The system of claim 16, wherein the diplexer converts the digitized upstream signal to the first format.

19. The system of claim 18, wherein the upstream signal regulator provides the digitized upstream signal directly to the diplexer.

* * * * *